United States Patent
Allen et al.

(10) Patent No.: US 8,498,078 B2
(45) Date of Patent: Jul. 30, 2013

(54) MAGNETIC HEAD WITH FLARED WRITE POLE HAVING MULTIPLE TAPERED REGIONS

(75) Inventors: Donald G. Allen, Morgan Hill, CA (US); Liubo Hong, San Jose, CA (US); Aron Pentek, San Jose, CA (US); Thomas J. A. Roucoux, San Jose, CA (US); Sue S. Zhang, Saratoga, CA (US); Yi Zheng, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 553 days.

(21) Appl. No.: 12/634,533

(22) Filed: Dec. 9, 2009

(65) Prior Publication Data

US 2011/0134569 A1    Jun. 9, 2011

(51) Int. Cl.
  *G11B 5/147*  (2006.01)
  *G11B 5/187*  (2006.01)

(52) U.S. Cl.
  USPC ............ 360/125.15; 360/125.11; 360/125.12; 360/125.3

(58) Field of Classification Search
  USPC ............ 360/125.03, 125.06, 125.08, 125.11, 360/125.12, 125.15, 125.3
  See application file for complete search history.

(56) References Cited

U.S. PATENT DOCUMENTS

| | | | |
|---|---|---|---|
| 4,807,076 A | 2/1989 | Nakashima et al. | |
| 6,069,775 A * | 5/2000 | Chang et al. | 360/125.52 |
| 6,693,768 B1 | 2/2004 | Crue et al. | |
| 7,006,326 B2 | 2/2006 | Okada et al. | |
| 7,042,682 B2 | 5/2006 | Hu et al. | |
| 7,061,719 B2 * | 6/2006 | Matono et al. | 360/125.51 |
| 7,159,302 B2 | 1/2007 | Feldbaum et al. | |
| 7,180,705 B2 | 2/2007 | Matono et al. | |
| 7,212,379 B2 | 5/2007 | Hsu et al. | |
| 7,245,454 B2 | 7/2007 | Aoki et al. | |
| 7,248,437 B2 * | 7/2007 | Yazawa et al. | 360/125.12 |
| 7,251,878 B2 | 8/2007 | Le et al. | |
| 7,253,991 B2 | 8/2007 | Fontana, Jr. et al. | |

(Continued)

FOREIGN PATENT DOCUMENTS

| | | |
|---|---|---|
| EP | 1835489 A2 | 9/2007 |
| JP | 3209609 A | 9/1991 |
| JP | 6329311 A | 11/1994 |
| JP | 2009076127 A | 4/2009 |

OTHER PUBLICATIONS

Lijie Guan, Joe Smyth, Moris Dovek, Sui-Yan Chan, and Tatsuya Shimizu, A Trailing Shield Perpendicular Writer Design With Tapered Write Gap for High Density Recording, IEEE Transactions on Magnetics, Nov. 2008, pp. 3396-3399, Vol. 44, No. 11.

(Continued)

*Primary Examiner* — Jefferson Evans
(74) *Attorney, Agent, or Firm* — Patterson & Sheridan, LLP

(57) ABSTRACT

Methods for fabrication of tapered magnetic poles with a non-magnetic front bump layer. A magnetic pole may have a plurality of tapered surfaces at or near an air bearing surface (ABS), wherein a thickness of the write pole increases in a direction away from the ABS. A non-magnetic front bump layer may be formed on one or more of the tapered surfaces of the magnetic pole at a distance from the ABS. The front bump layer may increase the separation distance between a shield layer and the magnetic pole near the tapered surface, thereby improving the performance of the write head.

10 Claims, 18 Drawing Sheets

U.S. PATENT DOCUMENTS

| | | |
|---|---|---|
| 7,253,992 B2 | 8/2007 | Chen et al. |
| 7,324,304 B1 | 1/2008 | Benakli et al. |
| 7,327,533 B2 | 2/2008 | Guan |
| 7,343,668 B2 | 3/2008 | Kobayashi |
| 7,365,942 B2 | 4/2008 | Sasaki et al. |
| 7,375,925 B2 | 5/2008 | Sasaki et al. |
| 7,394,621 B2 | 7/2008 | Li et al. |
| 7,417,824 B2 | 8/2008 | Kameda |
| 7,417,825 B2 | 8/2008 | Sasaki et al. |
| 7,430,095 B2 | 9/2008 | Benakli et al. |
| 7,436,628 B2 | 10/2008 | Kameda et al. |
| 7,440,230 B2 | 10/2008 | Hsu et al. |
| 7,443,633 B2 | 10/2008 | Tagami et al. |
| 7,457,080 B2 | 11/2008 | Watabe et al. |
| 7,924,528 B2 * | 4/2011 | Sasaki et al. .............. 360/125.15 |
| 2005/0219743 A1 | 10/2005 | Guan et al. |
| 2005/0219747 A1 * | 10/2005 | Hsu et al. ...................... 360/126 |
| 2007/0285837 A1 | 12/2007 | Im et al. |
| 2008/0019045 A1 | 1/2008 | Otagiri et al. |
| 2008/0297953 A1 | 12/2008 | Matono et al. |
| 2008/0316653 A1 | 12/2008 | Sasaki et al. |
| 2009/0059426 A1 | 3/2009 | Sasaki et al. |
| 2009/0122445 A1 | 5/2009 | Jiang et al. |
| 2009/0297946 A1 | 12/2009 | Yue et al. |
| 2010/0155364 A1 * | 6/2010 | Pentek et al. .................... 216/11 |
| 2010/0157472 A1 * | 6/2010 | Hsiao et al. .............. 360/123.12 |
| 2010/0277832 A1 * | 11/2010 | Bai et al. .................. 360/125.03 |
| 2011/0132869 A1 * | 6/2011 | Hong et al. ...................... 216/22 |
| 2011/0134567 A1 * | 6/2011 | Chen et al. ............... 360/123.12 |
| 2011/0134568 A1 | 6/2011 | Chen et al. |
| 2011/0135959 A1 | 6/2011 | Hong |
| 2011/0135962 A1 * | 6/2011 | Hong et al. .................... 428/815 |
| 2011/0146062 A1 * | 6/2011 | Allen et al. ................. 29/603.18 |
| 2011/0147222 A1 * | 6/2011 | Pentek et al. .................. 205/170 |
| 2011/0151279 A1 * | 6/2011 | Allen et al. .................... 428/815 |
| 2011/0262774 A1 * | 10/2011 | Pentek et al. .................. 428/815 |

OTHER PUBLICATIONS

Hitachi Corporation and Jeffrey Lille, Non-magnetic metrology layer for perpendicular pole, IP.com Prior Art Database Technical Disclosure, Sep. 27, 2004, IP.com Electronic Publication IPCOM000031484D.

IBM TDB, T. J. Beaulieu and R. W. Wood, Improved Perpendicular Recording Head, IP.com Prior Art Database Technical Disclosure, Jan. 30, 2005, IP.com Electronic Publication IPCOM000037905D.

IBM TDB and T. A. Schwartz, Perpendicular Recording Read Write Head With High Reluctance Leg, IP.com Prior Art Database Technical Disclosure, original publication date: Sep. 1, 1981, IP.com Electronic Publication IPCOM000053181D dated Feb. 12, 2005.

S. Wang, E. Louis, J. Wolfson, R. Anderson, and M. H. Kryder, A Perpendicular Contact Recording Head with High Moment Laminated FeAin/NiFe Pole Tips, IEEE Transactions on Magnetics, Nov. 1994, pp. 3897-3899, Vol. 30, No. 6.

* cited by examiner

MAGNETIC HEAD WITH FLARED WRITE POLE HAVING MULTIPLE TAPERED REGIONS

BACKGROUND OF THE INVENTION

1. Field of the Invention

Embodiments of the present invention generally relate to magnetic write heads, and more specifically to fabrication of magnetic write heads with tapered magnetic poles and a front bump layer.

2. Description of the Related Art

Magnetic head-based systems have been widely accepted in the computer industry as a cost-effective form of data storage. In a magnetic disk drive system, a magnetic recording medium in the form of a disk rotates at high speed while a magnetic head "flies" slightly above the surface of the rotating disk. The magnetic disk is rotated by means of a spindle drive motor. The magnetic head is attached to or formed integrally with a "slider" which is suspended over the disk by a suspension assembly which in turn is attached to an actuator arm. As the magnetic disk rotates at an operating speed, the moving air generated by the rotating disk in conjunction with the physical design of the slider lifts the magnetic head, allowing it to glide or "fly" slightly above and over the disk surface on a cushion of air, referred to as an air bearing.

Magnetic disks are desirable mediums of storage because they are nonvolatile; i.e., no power is required to preserve the data. There has been increasing progress in the field of magnetic disk storage system technology in recent years. Such success has made storage systems an important component of modern computers. Some of the most important customer attributes of any storage system are the cost per megabyte, data rate, and access time. Improvements in areal density (the amount of information that can be placed within a given area on a disk drive), have been the chief driving force behind the historic improvement in storage cost. In fact, the areal density of magnetic disk storage systems continues to increase. As the magnetic particles that make up recorded data on a magnetic disk become ever smaller, technical difficulties in writing and reading such small bits occur.

Perpendicular recording is one approach to achieve larger areal densities when compared with longitudinal recording. In recent years, increased demand for higher data rate and areal density has driven the perpendicular head design to scale toward smaller dimensions and has resulted in a need for constant exploration of new head designs, materials, and practical fabrication methods.

Some of the problems encountered with perpendicular recording are side writing and side erasure to adjacent tracks on the disk. These problems occur from leakage and fringing of the magnetic flux from the magnetic write head. To minimize these effects, one approach is to provide either a trailing or wrap-around shield on the magnetic write head. These shields allow effective magnetic flux to be provided for writing to the disk, while avoiding leakage and fringing that can lead to the above-described problems. As the areal density of the disks increases, however, the ability of existing shields to achieve the desired results decreases.

SUMMARY OF THE INVENTION

Embodiments of the present invention generally relate to magnetic write heads, and more specifically to fabrication of magnetic write heads with tapered magnetic poles and a front bump layer.

One embodiment of the invention provides a method for fabricating a magnetic head. The method generally comprises forming a flared write pole having a first tapered surface proximate an air bearing surface of the magnetic head and a pole tip region, and patterning a first non-magnetic layer on the write pole, wherein the first non-magnetic layer is formed on the first tapered surface, wherein the patterning of the first non-magnetic layer exposes the pole tip region. The method further comprises etching the write pole using the first non-magnetic layer as a mask, wherein the etching removes a portion of the write pole in the pole tip region to form a second tapered surface, and depositing a second non-magnetic layer over at least the second tapered surface.

Another embodiment of the invention provides another method for fabricating a magnetic head. The method generally comprises forming a flared write pole comprising (1) a first tapered surface proximate an air bearing surface of the magnetic head and (2) a pole tip region, wherein flared portions of the write pole are formed by removing portions of a write pole layer exposed by a masking layer, and patterning a first non-magnetic layer on the masking layer, wherein the first non-magnetic layer is formed over the first tapered surface, wherein the patterning of the first non-magnetic layer exposes a portion of the masking layer over the pole tip region. The method further comprises removing the exposed portion of the masking layer over the pole tip region using the first non-magnetic layer as a mask, wherein at least a portion of the pole tip region of the write pole is exposed after removing the exposed portion of the masking layer, and removing at least some of the exposed portion of the write pole, wherein removing at least some of the exposed portion of the write pole forms a second tapered surface of the write pole.

Yet another embodiment of the invention provides a magnetic head comprising a flared write pole comprising a first tapered region having a first surface and a second tapered region having a second surface. The magnetic head further comprises a first non-magnetic layer formed over the first surface, a second non-magnetic layer formed over at least the second surface, and a shield layer formed on the second non-magnetic layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention are generally related to magnetic write heads, and more specifically to methods for fabrication of tapered magnetic poles with a non-magnetic front bump layer. A magnetic pole may have a plurality of tapered surfaces at or near an air bearing surface (ABS), wherein a thickness of the write pole increases in a direction away from the ABS. A non-magnetic front bump layer may be formed on one or more of the tapered surfaces of the magnetic pole at a distance from the ABS. The front bump layer may increase the separation distance between a shield layer and the magnetic pole near the tapered surface, thereby improving the performance of the write head.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
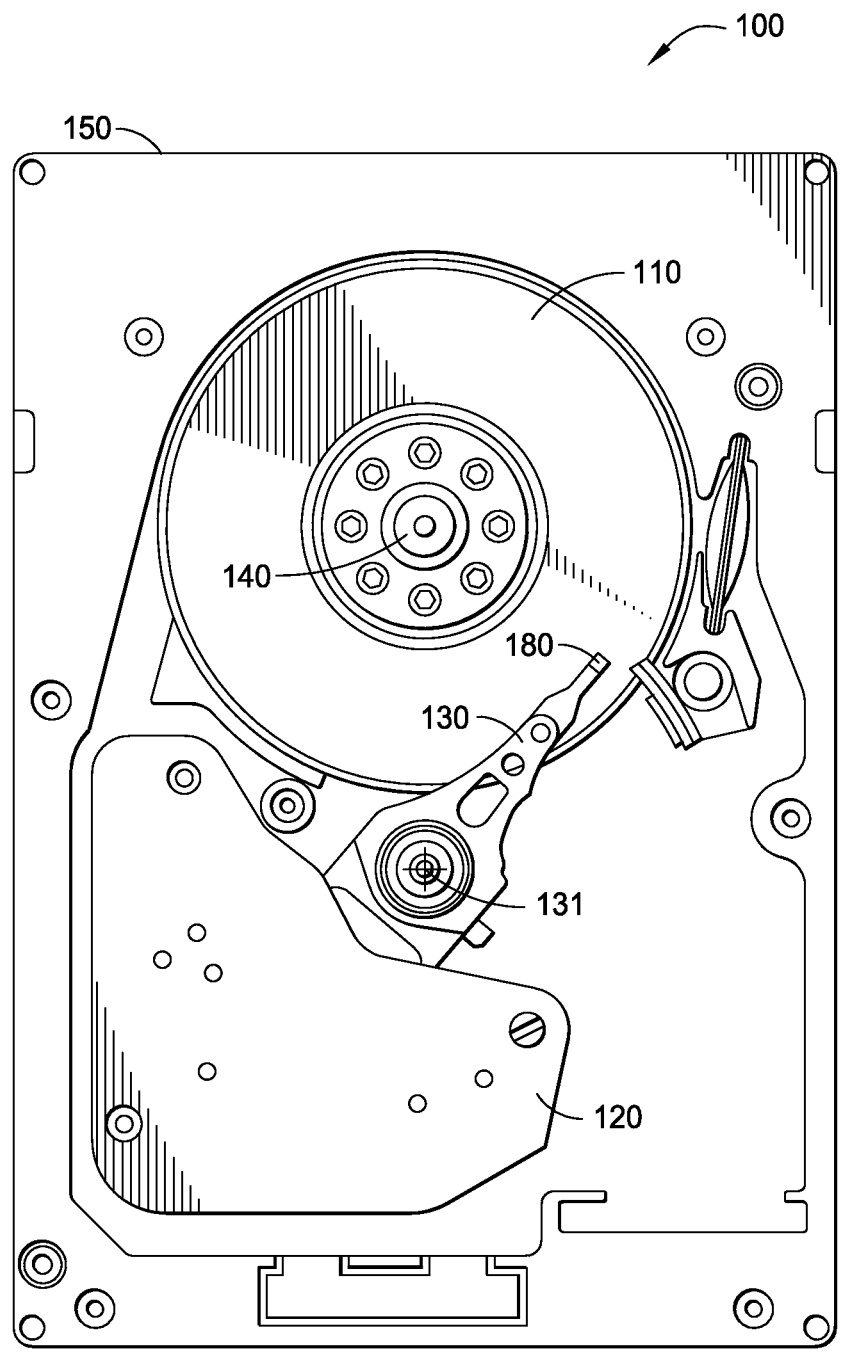
FIG. 1 illustrates an exemplary magnetic disk drive, according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may include circular tracks of data on both the top and bottom surfaces of the disk. An electromagnetic head 180 may be positioned on a track. As each disk spins, data may be written and/or read from the data track. Electromagnetic head 180 may be coupled to an actuator arm 130 as illustrated in FIG. 1. Actuator arm 130 may be configured to swivel around actuator axis 131 to place electromagnetic head 180 on a particular data track.

A plurality of magnetic disks may be stacked vertically in HDD 100. Each disk may have read and write tracks on each side of the disk. Therefore, electromagnetic heads may be placed on both sides of the disk. In some embodiments, a single magnetic head may be configured to access data tracks on the bottom face of a first disk and a top face of a second disk.

Each actuator arm 130 may be coupled to actuator 120. Actuator 120 may be a motor configured to control the swiveling movement of actuator arm 130 to place electromagnetic head 180 on a given data track. In one embodiment, the actuator arms may be connected. Therefore, all the actuator arms 130, and consequently all the electromagnetic heads 180 may move together.

Spindle motor 140 may be configured to rotate the magnetic disks at a predetermined rate. For example, the spindle motor 140 may be configured to spin at a rate of 10,000 revolutions per minute (rpm). One skilled in the art will recognize however, that any reasonable spin rate may be employed. The spin rate for example may depend on the type of disk drive, the type of computer, etc.

Figure 2A:
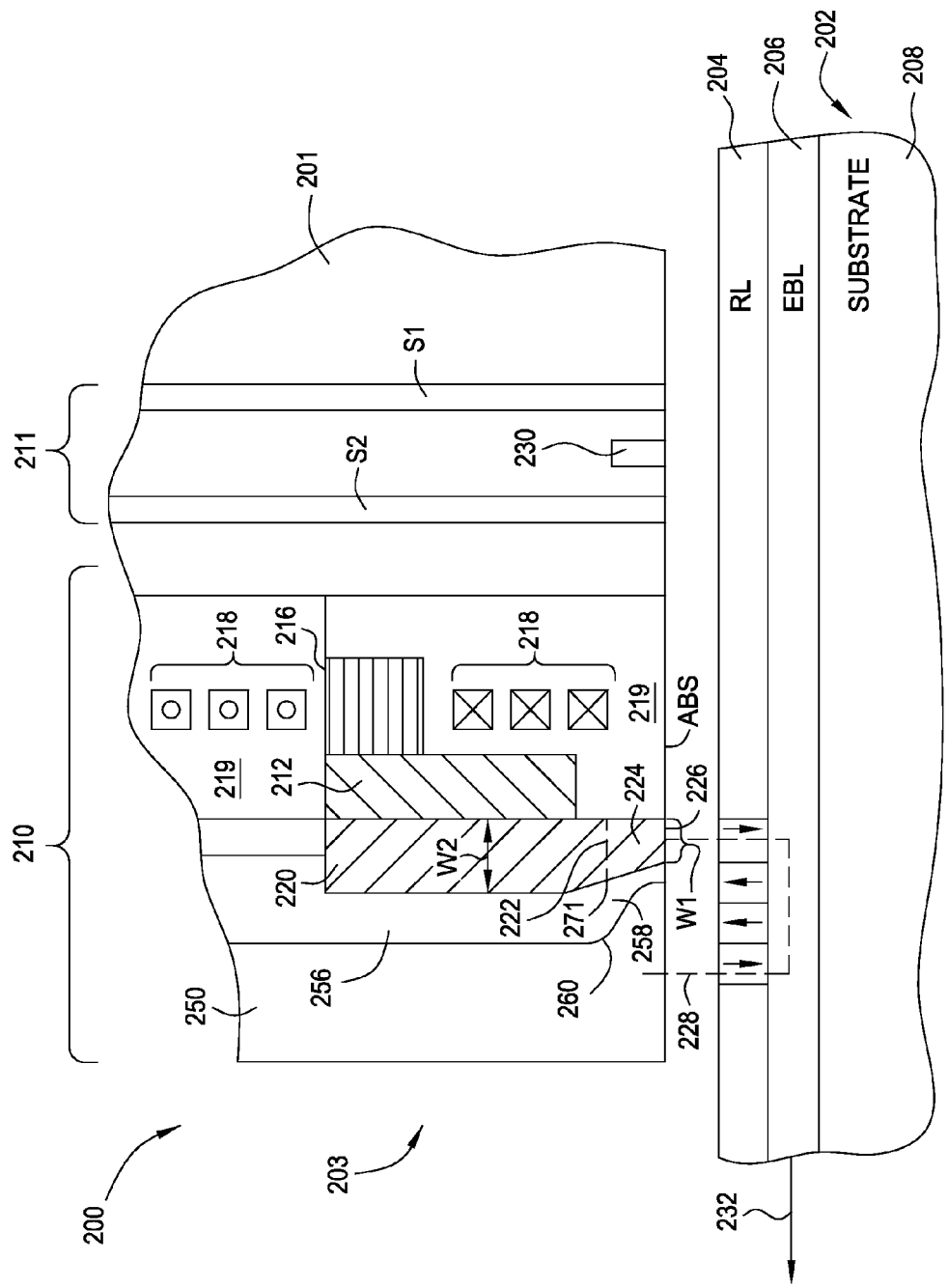
FIG. 2A is a side view of a read/write head and magnetic disk of the disk drive of FIG. 1, according to one embodiment of the invention

FIG. 2A is a fragmented, cross-sectional side view through the center of an embodiment of a read/write head 200 mounted on a slider 201 and facing magnetic disk 202. The read/write head 200 and magnetic disk 202 may correspond to the electromagnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (EPL) 206 formed on a disk substrate 208. The read/write head 200 includes an air bearing surface (ABS), a magnetic write head 210 and a magnetic read head 211, and is mounted such that its ABS is facing the magnetic disk 202. In FIG. 2A, the disk 202 moves past the write head 210 in the direction indicated by the arrow 232, so the portion of slider 201 that supports the read/write head 200 is often called the slider "trailing" end 203.

In some embodiments, the magnetic read head 211 is a magnetoresistive (MR) read head that includes an MR sensing element 230 located between MR shields 51 and S2. The RL 204 is illustrated with perpendicularly recorded or magnetized regions, with adjacent regions having magnetization directions, as represented by the arrows located in the RL 204. The magnetic fields of the adjacent magnetized regions are detectable by the MR sensing element 230 as the recorded bits.

The write head 210 includes a magnetic circuit made up of a main pole 212 and a yoke 216. The write head 210 also includes a thin film coil 218 shown in the section embedded in non-magnetic material 219 and wrapped around yoke 216. In an alternative embodiment, the yoke 216 may be omitted, and the coil 218 may wrap around the main pole 212. A write pole 220 (also referred to herein as "WP 220") is magnetically connected to the main pole 212 and has an end 226 that defines part of the ABS of the magnetic write head 210 facing the outer surface of disk 202.

Figure 2B:
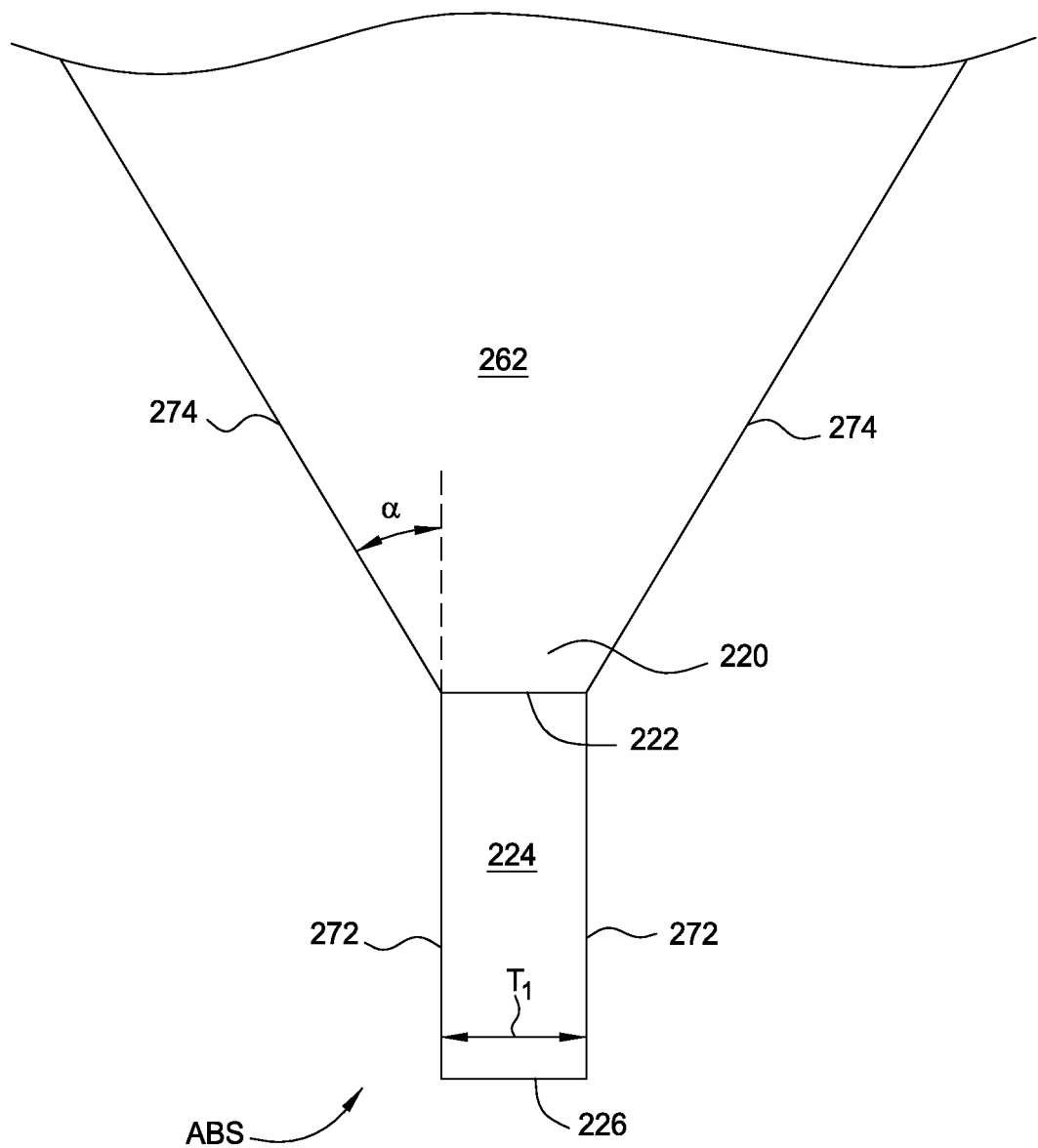
FIG. 2B is an enlarged top view of a portion of the read/write head of FIG. 2A, according to a further embodiment of the invention.

In some embodiments, write pole 220 is a flared write pole and includes a flare point 222 and a pole tip 224 that includes an end 226 that defines part of the ABS. In flared write pole embodiments, the width of the write pole 220 in a first direction (into and out of the page in FIG. 2A) increases from a first width at the flare point 222 to greater widths away from the ABS, as is shown in FIG. 2B. The flare may extend the entire height of write pole 220 (i.e., from the end 226 of the write pole 220 to the top of the write pole 220), or may only extend from the flare point 222, as shown in FIG. 2A. In one embodiment the distance between the flare point 222 and the ABS is between about 30 nm and about 150 nm.

In one embodiment of the invention, the WP 220 may be a tapered write pole. Accordingly, as illustrated in FIG. 2A, the WP 220 may include a tapered surface 271 which increases a width of the WP 220 from a first width W1 at the ABS to a second width W2 away from the ABS. In one embodiment, the width W1 may be between around 60 nm and 200 nm, and the width W2 may be between around 120 nm and 350 nm. While the tapered region 271 is shown with a single straight surface in FIG. 2A, in alternative embodiment, the tapered region 271 may include a plurality of tapered surface with different taper angles with respect to the ABS. The fabrication of the tapered region 271 is discussed in greater detail below.

The WP 220 may be tapered at the surface 271 to improve magnetic performance. For example, by reducing the width W1 at the ABS may concentrate a magnetic field generated by the WP 220 over desirable portions of the magnetic disk 202. In other words, reducing the width W1 of the WP 220 at the ABS reduces the probability that tracks adjacent to a desirable track are erroneously altered during writing operations.

While a small width of the WP 220 is desired at the ABS, it may be desirable to have a greater width of the WP 220 in areas away from the ABS. A larger width W2 of the WP 220 away from the ABS may desirably increase the magnetic flux to the WP 220, by providing a greater thickness of the WP 220 in a direction generally parallel to the ABS. In operation, write current passes through coil 218 and induces a magnetic field (shown by dashed line 228) from the WP 220 that passes through the RL 204 (to magnetize the region of the RL 204 beneath the WP 220), through the flux return path provided by the EBL 206, and back to an upper return pole 250. In one embodiment, the greater the magnetic flux of the WP 220, the greater is the probability of accurately writing to desirable regions of the RL 204.

FIG. 2A further illustrates one embodiment of the upper return pole or magnetic shield 250 that is separated from WP 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220. As FIG. 2A is a cross section through the center of the read/write head 200, it represents both trailing and wrap-around embodiments.

Near the ABS, the nonmagnetic gap layer 256 has a reduced thickness and forms a shield gap throat 258. The throat gap width is generally defined as the distance between the WP 220 and the magnetic shield 250 at the ABS. The shield 250 is formed of magnetically permeable material (such as Ni, Co and Fe alloys) and gap layer 256 is formed of nonmagnetic material (such as Ta, TaO, Ru, Rh, NiCr, SiC or $Al_2O_3$). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the write pole 220, while avoiding saturation of the shield 250.

It should be understood that the taper 260 may extend either more or less than is shown in FIG. 2A. The taper may extend upwards to an end of shield 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a greatest thickness at a second distance (greater than the first distance) from the ABS.

FIG. 2B shows an enlarged top view of the WP 220 of FIG. 2A, with the shield layer 250 and the gap layer 256 removed to show details of the WP 220, according to an embodiment of the invention. The WP 220 includes flared sides 274, which extend from the flare point 222 away from the ABS, such that the main pole increases from a first width $T_1$ to greater widths in a direction away from the ABS.

In some embodiments, the first width, $T_1$ is between 20 nm and 150 nm. The flared sides 274 form an angle α with respect to a plane parallel to the ABS surface. In one embodiment α is between about 30° and about 60°. The flare point 222 may be between about 30 nm and about 275 nm from the ABS.

Figure 3A:
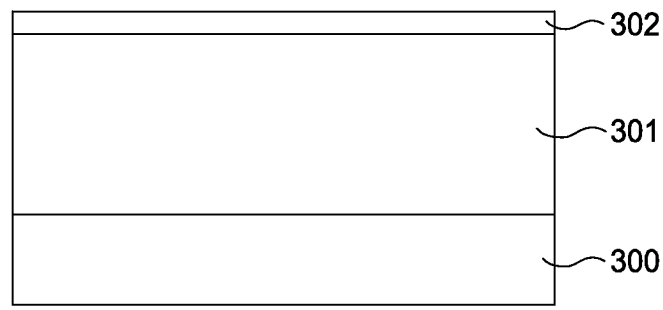
FIGS. 3A-Q illustrate an exemplary method for forming a flared write pole with a first tapered region, according to an embodiment of the invention.
Figure 3B:
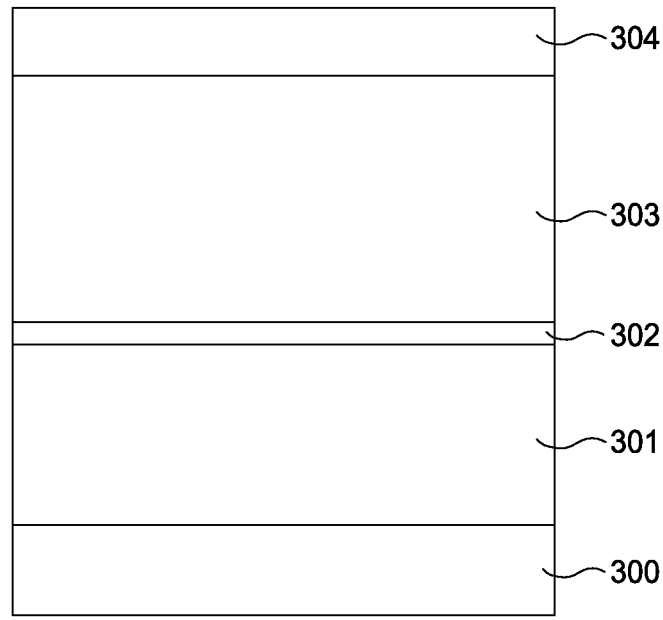
Figure 3C:
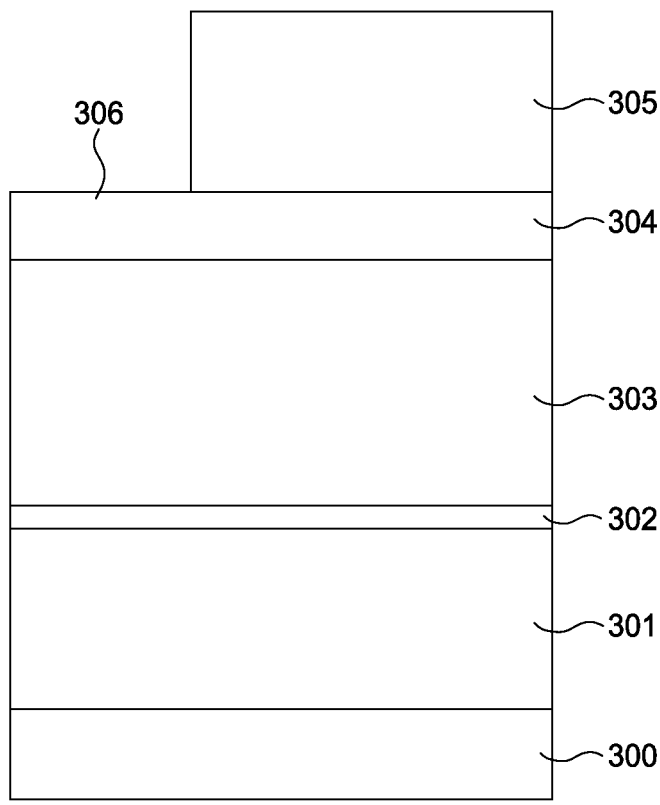
Figure 3D:
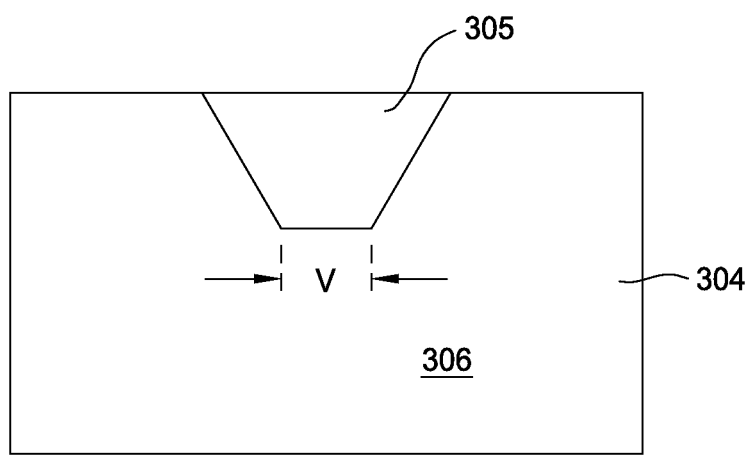
Figure 3E:
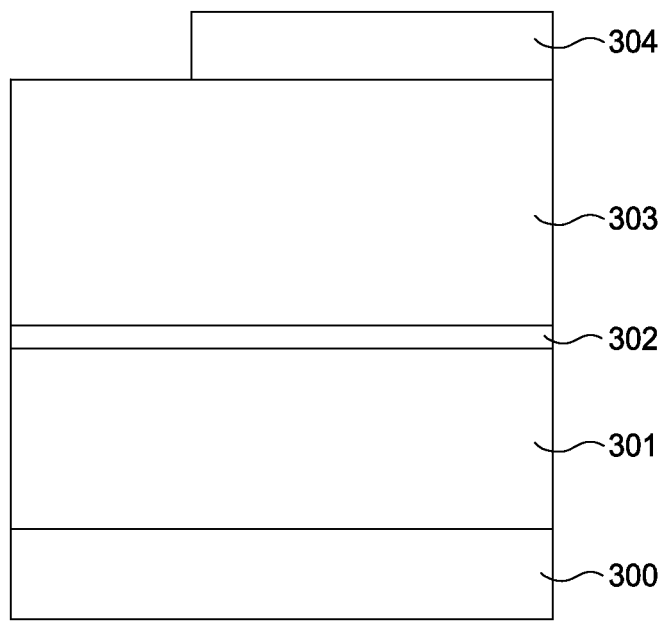
Figure 3F:
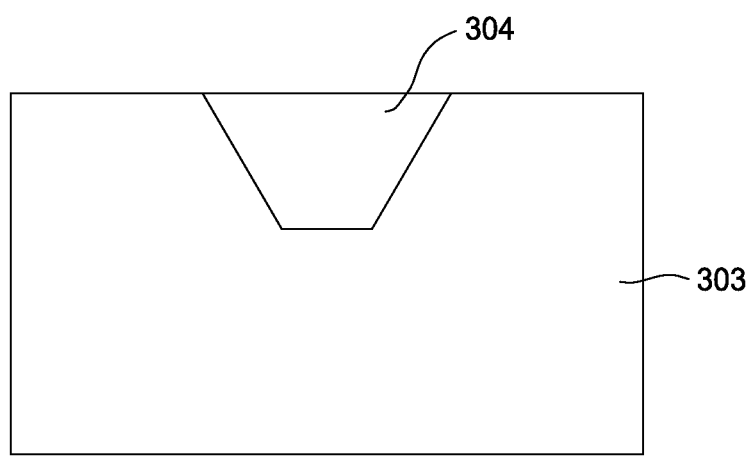
Figure 3G:
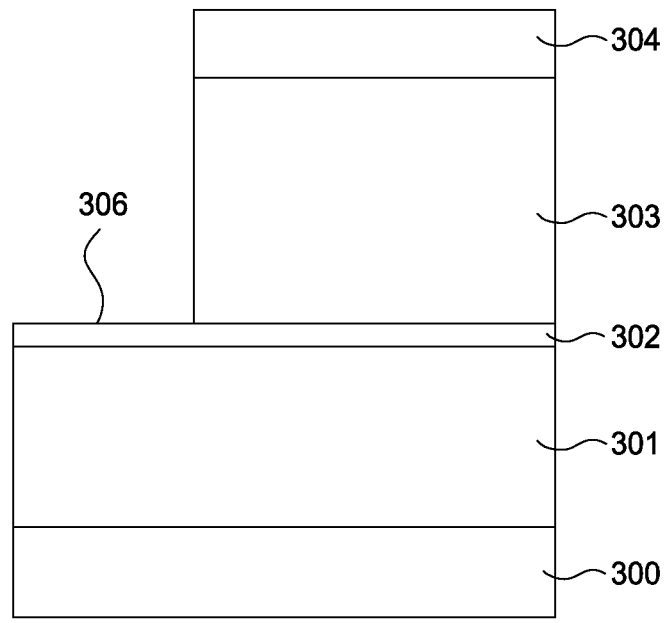
Figure 3H:
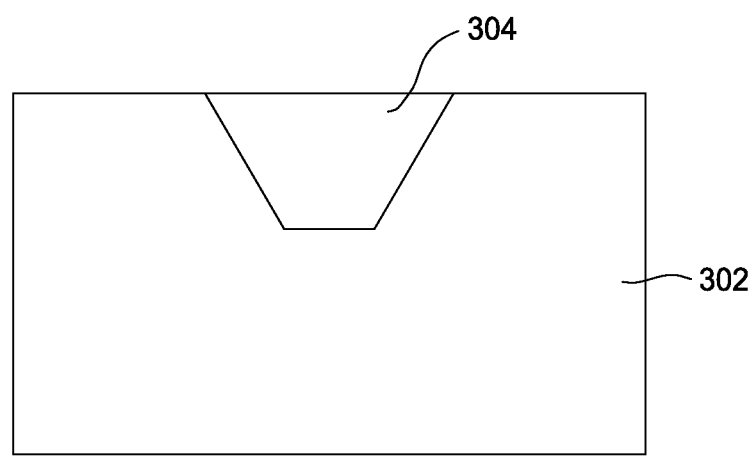
Figure 3:
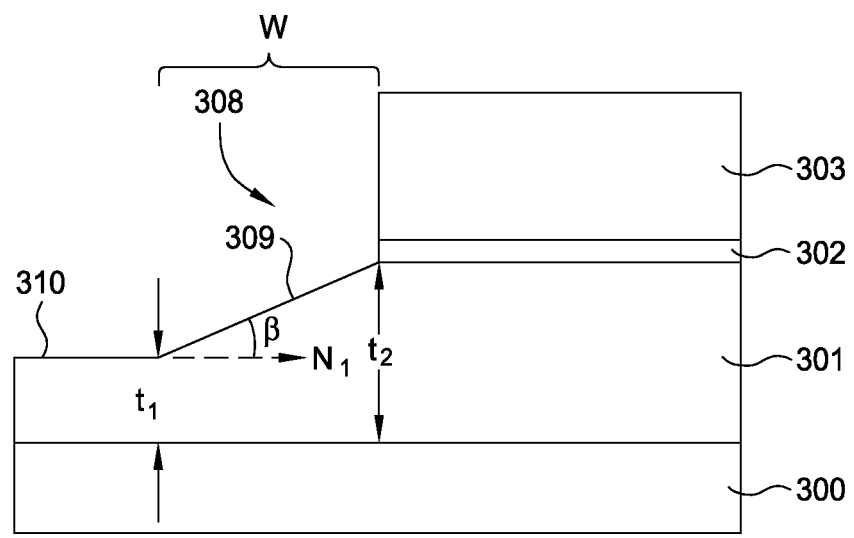
Figure 3J:
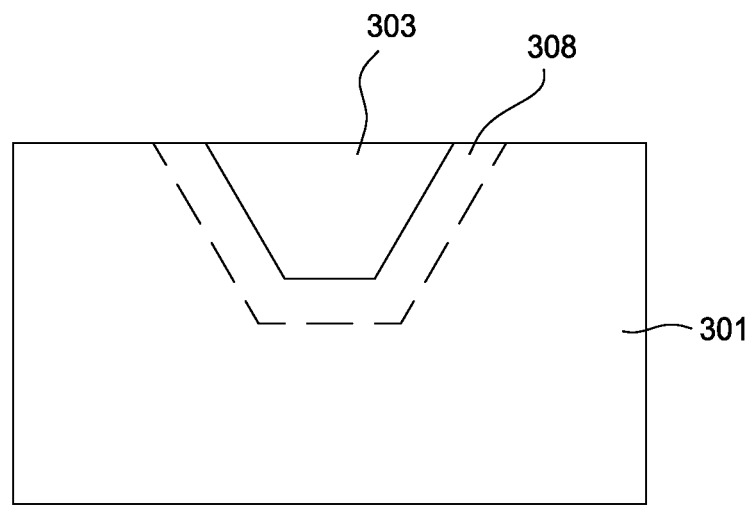
Figure 3K:
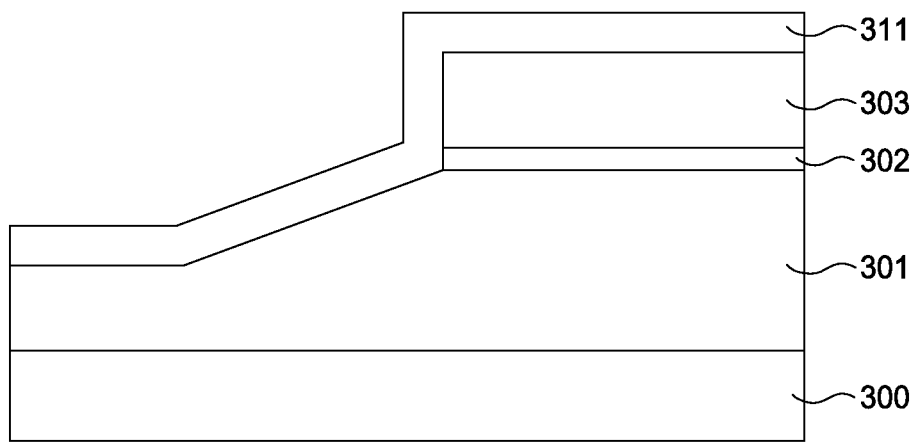
Figure 3L:
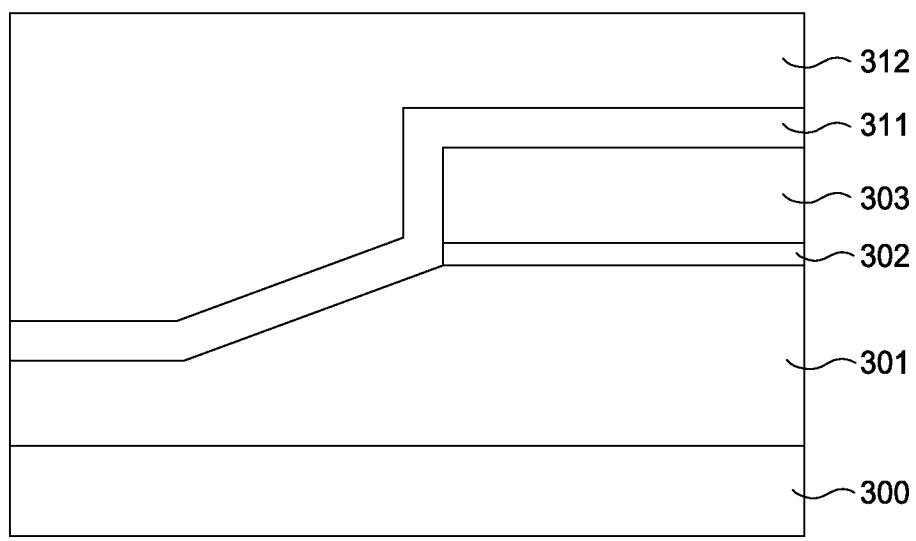
Figure 3M:
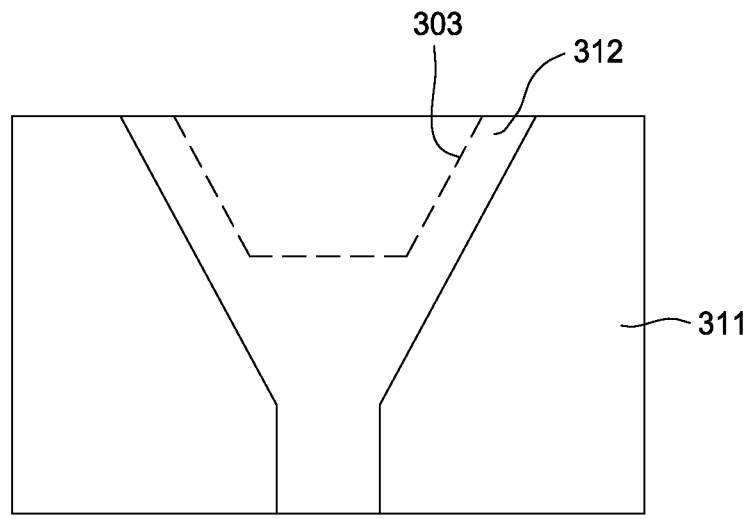
Figure 3N:
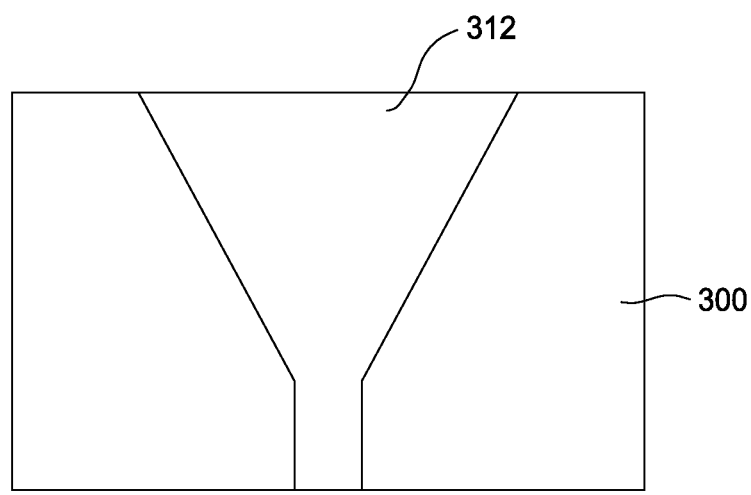
Figure 3:
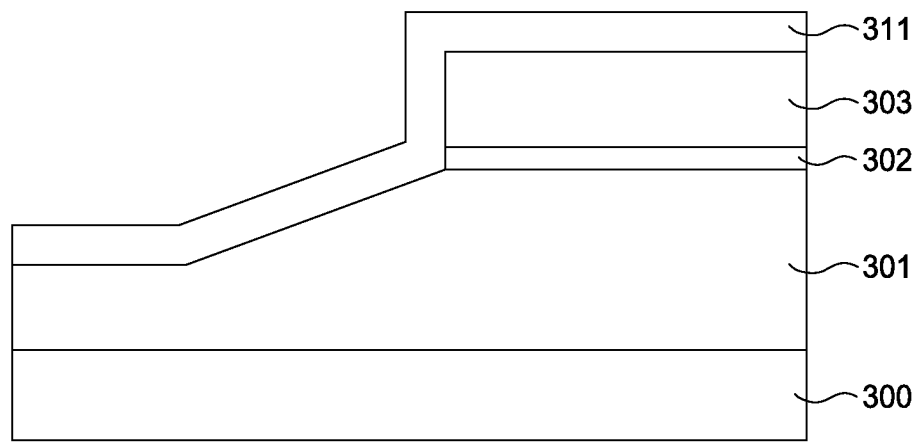
Figure 3P:
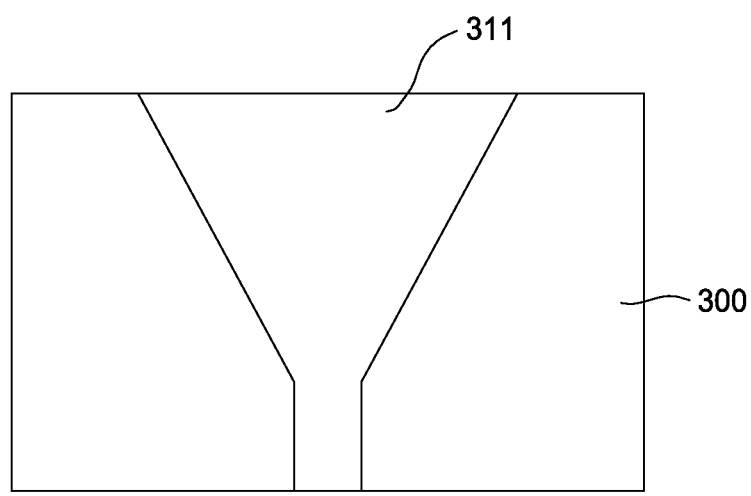
Figure 3Q:
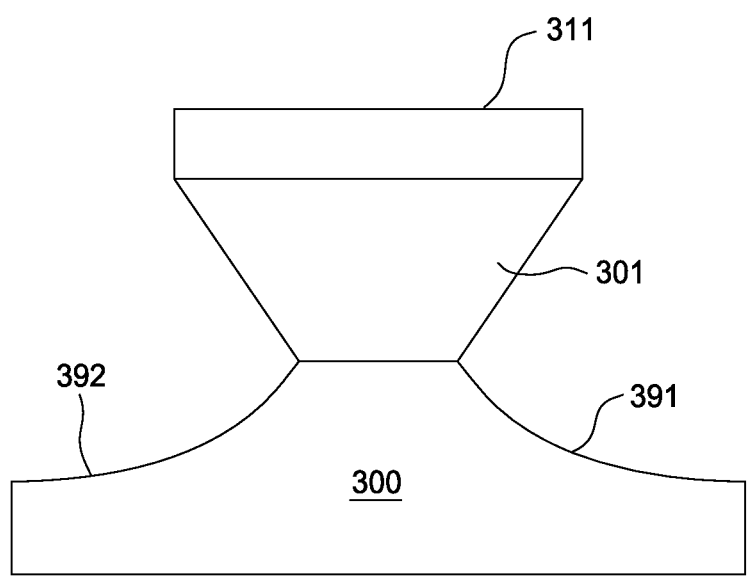

FIGS. 3A-Q illustrates exemplary steps performed during fabrication of a write pole and a portion of a gap layer, e.g. the write pole 220 and gap layer 256 of FIG. 2A, according to an embodiment of the invention. As illustrated in FIG. 3A, in one embodiment, fabrication of a write pole may begin by providing a substrate 300 on which a laminate layer 301 and a Reactive Ion Etching (RIE) stop layer 302 have been formed. The substrate 300 may be composed of a non-magnetic material. For example, in one embodiment, the substrate layer 300 may be composed of Aluminum Oxide ($Al_2O_3$). While not shown in the Figures, the substrate 300 may include one or more other components of a magnetic head, e.g., a read head and one or more components of a write head already formed therein.

The laminate layer 301 may be composed of one or more ferromagnetic materials, for example, Cobalt-Iron (CoFe), Cobalt-Nickel-Iron (CoNiFe), and Nickel-Iron (NiFe), or the like. In one embodiment, the laminate layer 301 may have a thickness between around 120 nm and 350 nm. A write pole may be formed with the laminate layer 301 using the method described below.

The RIE stop layer 302 may be composed of a material that does not react with ions in a RIE process. Exemplary materials that may be used to form the RIE stop layer 302 include Chromium (Cr), Nickel-Chromium (NiCr), or the like. In one embodiment of the invention, the RIE stop layer 302 may have a thickness of around 3 nm to around 150 nm. The laminate layer 301 and the RIE stop layer 302 may be formed on the substrate 300 using any conventional deposition technique, for example, sputter deposition, chemical vapor deposition, electroplating, and the like.

In one embodiment of the invention, a non magnetic layer 303 and a mask layer 304 may be deposited on the RIE stop layer 302, as illustrated in FIG. 3B. In one embodiment of the invention, the non-magnetic layer 303 may be formed with Silicon Carbide (SiC). Alternatively, the non-magnetic layer 303 may be formed with Aluminum Oxide ($Al_2O_3$), Tantalum (Ta), Tantalum Oxide (TaO), Diamond-like Carbon (DLC), Silicon dioxide ($SiO_2$), Silicon Nitride (SiN), or the like. In one embodiment of the invention, the non-magnetic layer 303 may have a thickness of around 100 nm to around 500 nm.

In one embodiment, the combination of the non-magnetic layer 303 and the RIE stop layer 302 may form a part of a gap layer, e.g., the gap layer 256 of FIG. 2A. Specifically, the non-magnetic layer 303 and the RIE stop layer may form a top bump layer that provides separation between a shield layer and the magnetic pole formed with the laminate layer 301. Specifically, the top bump layer may be formed over a flared portion of the write pole. The mask layer 304 may be formed with Chromium, and may have a thickness of around 5 nm to around 50 nm, in one embodiment.

A resist mask 305 may be patterned on the mask layer 304, as illustrated in FIG. 3C. As further illustrated in FIG. 3C, the resist mask may expose a surface 306 of the mask layer 304. In one embodiment, the resist mask 305 may be composed of 193 resist, and may have a thickness between around 0.15 to 0.7 μm. FIG. 3D is a top view of the structure illustrated in FIG. 3C. As shown in FIG. 3D, the resist mask 305 may have a flared shape, which may correspond to the flared shape of a write pole that is being fabricated. As further illustrated, the resist mask 305 may have a minimum width V between around 0 μm and 1 μm.

In one embodiment, the mask layer surface 306 that is exposed by the resist mask 305 may be removed in an ion milling process. Thereafter, the resist mask 305 may be stripped. The resulting structure is illustrated in FIG. 3E. As illustrated in FIG. 3E, a portion of the non-magnetic layer 303 may be exposed as a result of the ion milling. The portion of the mask layer 304 that was covered by the resist mask 305 still remains. FIG. 3F illustrates a top view of the structure after the milling step. As illustrated in FIG. 3F, the flared shape of the resist mask 305 (See FIG. 3D) may be transferred to the metal layer 304. Furthermore, the non-magnetic layer 303 is exposed as a result of the ion milling.

In one embodiment, the patterned mask layer 304 may be used as a mask, and the pattern thereof may be transferred to the non-magnetic layer 303 in a Reactive Ion Etching (RIE) process. FIG. 3G illustrates the structure after the RIE process. As illustrated, the RIE process may remove portions of the non-magnetic layer 303 that are not covered by the patterned mask layer 304, thereby exposing a surface 306 of the RIE stop layer 302. FIG. 3H illustrates a top view of the structure after the RIE process. As illustrated in FIG. 3H, the RIE process may expose a surface 306 of the RIE stop layer 302.

After the RIE process, the structure may be exposed to an ion milling process to form a tapered region in the laminate layer 301. FIG. 3I illustrates a tapered region 308 that may be formed in the laminate layer 301 as a result of the ion milling. As illustrated in FIG. 3I, the tapered region may have a minimum thickness t1 proximate to an Air Bearing Surface (ABS) end, and a maximum thickness t2. The minimum thickness t1 may be around 90 nm in one embodiment. The thickness t2 may be between around 90 nm and 350 nm. The tapered region may also include a tapered surface 309, which may have an angle β with respect to a direction N1 normal to the ABS surface. In one embodiment, the angle β may be between around 10 degrees and 40 degrees. In one embodiment, the tapered surface 309 may have multiple curvature angles. The width W of the tapered region may be between around 100 nm and 200 nm in one embodiment.

As illustrated in FIG. 3I, the ion milling step may also result in a surface 310 that is substantially normal to the ABS surface. As further illustrated in FIG. 3I, the ion milling process may remove the mask layer 304 and expose portions of the non-magnetic layer 303. The ion milling process may also reduce the thickness of the non-magnetic layer 303, in some embodiments. FIG. 3J illustrates a top view of the structure after the ion milling process. As illustrated in FIG. 3J, the ion milling process exposes the laminate layer 301 and the patterned non-magnetic layer 303.

In one embodiment, a hard mask layer 311 may be deposited on the structure after the ion milling process. FIG. 3K illustrates the structure after deposition of the hard mask layer 311. The hard mask layer may be formed with one or more of aluminum oxide, carbon, diamond like carbon, tantalum, tantalum oxide, titanium, titanium nitride, silicon nitride, silicon dioxide, or the like. In one embodiment, the hard mask layer may have a thickness between around 10 nm and 200 nm. In one embodiment, the hard mask layer 311 may completely cover exposed surfaces of the laminate layer 301 and the non-magnetic layer 303.

A mask layer 312 may be patterned on the hard mask layer 311, as illustrated in FIG. 3L. In one embodiment, the mask layer 412 may be a resist, a Durimide under reist, or Durimide under hard mask which is patterned by a resist mask. FIG. 3M illustrates a top view of the structure after deposition of the resist mask. As illustrated in FIG. 3M, the resist mask may have a flared pattern that may correspond to the flared pattern of the write pole 220 illustrated in FIG. 2B. Furthermore, the mask layer 312 may completely cover portions of the structure comprising the non-magnetic layer 303, as illustrated in FIG. 3M.

In one embodiment, the mask layer 312 may be used as a mask in an ion milling process to remove portions of the hard mask layer 311 and the laminate layer 301. FIG. 3N illustrates a top view of the structure after the ion milling process. As illustrated in FIG. 3N, the ion milling process may remove portions of the hard mask layer 311 and laminate layer 301 that are not under the mask layer 312, thereby exposing the substrate 300. After the ion milling process, the mask layer 312 may be stripped.

FIG. 3O illustrates a transverse view of the structure after the ion milling and mask layer strip process. As illustrated in FIG. 3O, the structure may include the laminate layer 301 with the tapered region 308 formed on the substrate 300. The structure may also include the RIE stop layer 302 and a non-magnetic layer 303 formed on a portion of the laminate layer 301. Furthermore, a hard mask layer 311 may be formed over surfaces of the laminate layer 301, the non magnetic layer 303, and sidewall portions of the RIE stop layer 302 and the non magnetic layer 303, as illustrated in FIG. 3O.

FIG. 3P illustrates a top view of the structure after stripping of the mask layer 312. As illustrated in FIG. 3P, the structure may include hard mask layer 311 formed in the shape of a tapered write pole. The laminate layer 301 under the hard mask layer may be an example of a write pole, e.g., the write pole 220 described hereinabove with reference to FIGS. 2A and 2B. FIG. 3Q illustrates an ABS view of the structure. As illustrated in FIG. 3Q, the laminate layer (write pole) may include a substantially trapezoidal shape at the ABS. Also illustrated in FIG. 3Q is the hard mask layer 311 and the substrate 300 which are adjacent to the top and bottom surfaces respectively of the laminate layer 301. The substrate 300 is shown with curved sides 391 and 392 that may be formed during patterning of the write pole 301.

After forming a write pole using the process described hereinabove with respect to FIGS. 3A-Q, one or more further processing steps may be performed to fabricate further portions of the gap layer, e.g., the gap layer 256 and write pole 220 illustrated in FIG. 2A. FIGS. 4A-H illustrate an exemplary method for fabricating the further portions of the gap layer, e.g., a front bump and write pole 220, according to an embodiment of the invention. The front bump may refer to a portion of the gap layer that is formed over a tapered region and portions of the pole tip region of the write pole.

Figure 4A:
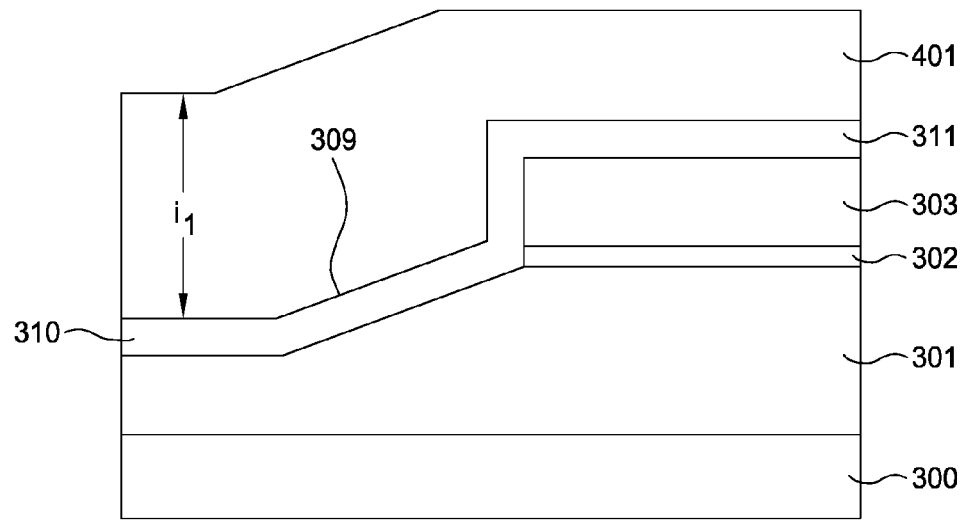
FIGS. 4A-H illustrate an exemplary method for forming a gap layer and a second tapered region on the write pole formed using the method of FIGS. 3A-Q, according to an embodiment of the invention.

In one embodiment, fabrication of the gap layer may begin by depositing a non-magnetic layer on the structure formed using the process of FIGS. 3A-Q. FIG. 4A illustrates a non-magnetic layer 401 that is deposited on a write pole structure comprising the write pole 301, a hard mask layer 311, RIE stop layer 302, non-magnetic layer 303, and a substrate 300. The non-magnetic layer 401 may be made from any suitable material including, for example, Tantalum (Ta), Tantalum Oxide (TaO), Ruthenium (Ru), Nickel-Chromium (NiCr), Silicon Carbide (SiC) or Aluminum Oxide ($Al_2O_3$), or the like. In a particular embodiment, the thickness it of the non-magnetic layer 401 may be around 50 nm to 200 nm.

Figure 4B:
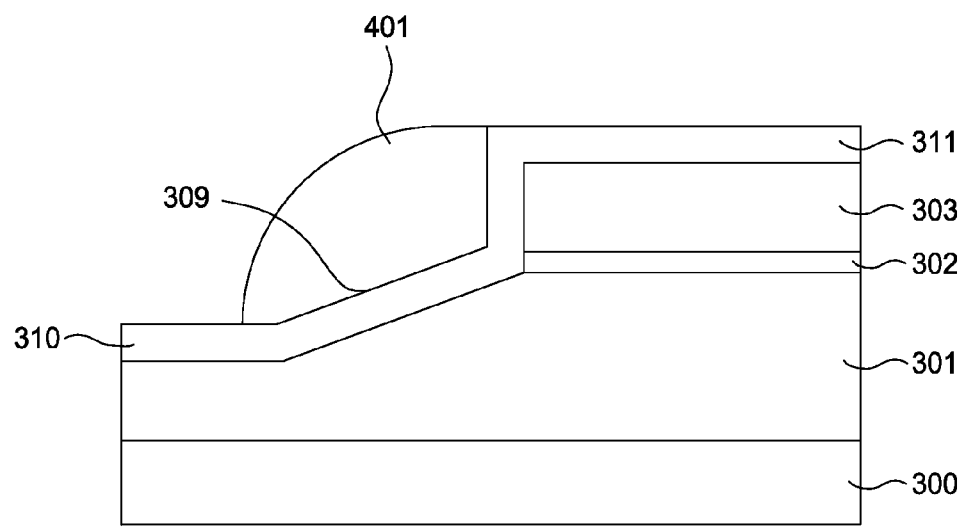

In one embodiment, after deposition of the non-magnetic layer 401, an ion milling or reactive ion etching (RIE) step may be performed to remove excess portions of the non-magnetic layer 401. FIG. 4B illustrates the non-magnetic layer 401 after the ion milling process. As illustrated in FIG. 4B, after the ion milling, portions of the non-magnetic layer 401 remain over the tapered surface 309 in the tapered region 308 and over a portion of the surface 310 of the magnetic pole 301. In one embodiment, the width W of the region including the tapered surface and the non-magnetic layer 401 formed thereon may be around 100 nm to 200 nm.

Figure 4C:
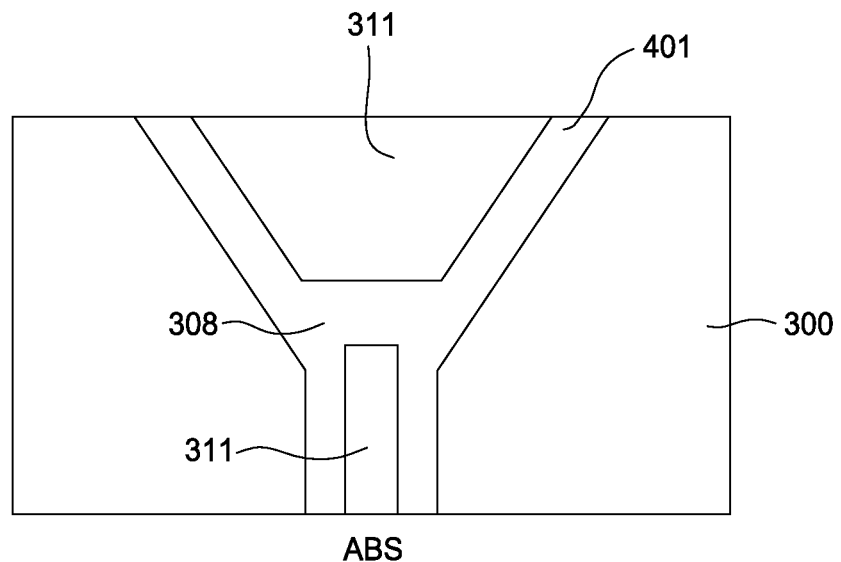
Figure 4D:
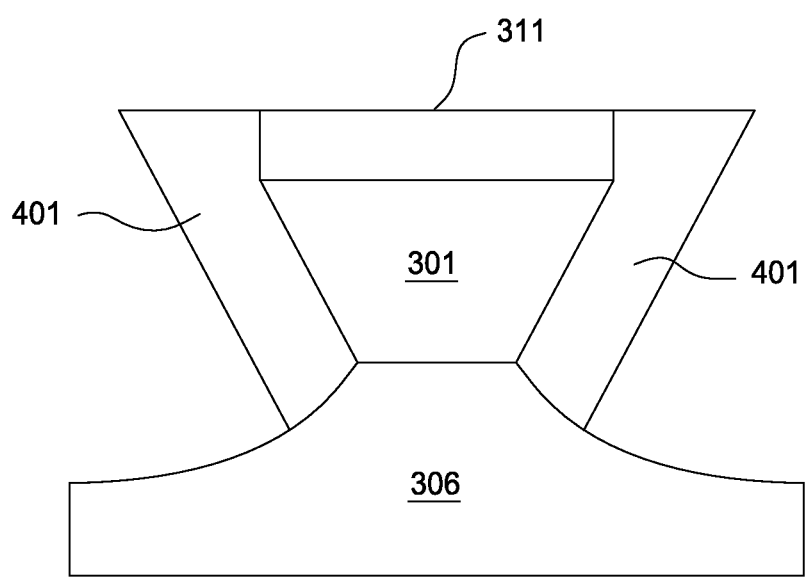

FIG. 4C illustrates a top view of the structure after the ion milling process. As illustrated in FIG. 4C, portions of the non-magnetic layer 401 may remain along sidewall portions of the magnetic pole 301 and the hard mask layer 311. FIG. 4D illustrates an ABS view of the structure, which further illustrates remaining portions of the non-magnetic layer 401 formed along sidewall portions of the magnetic pole 301 and the hard mask layer 311.

Figure 4E:
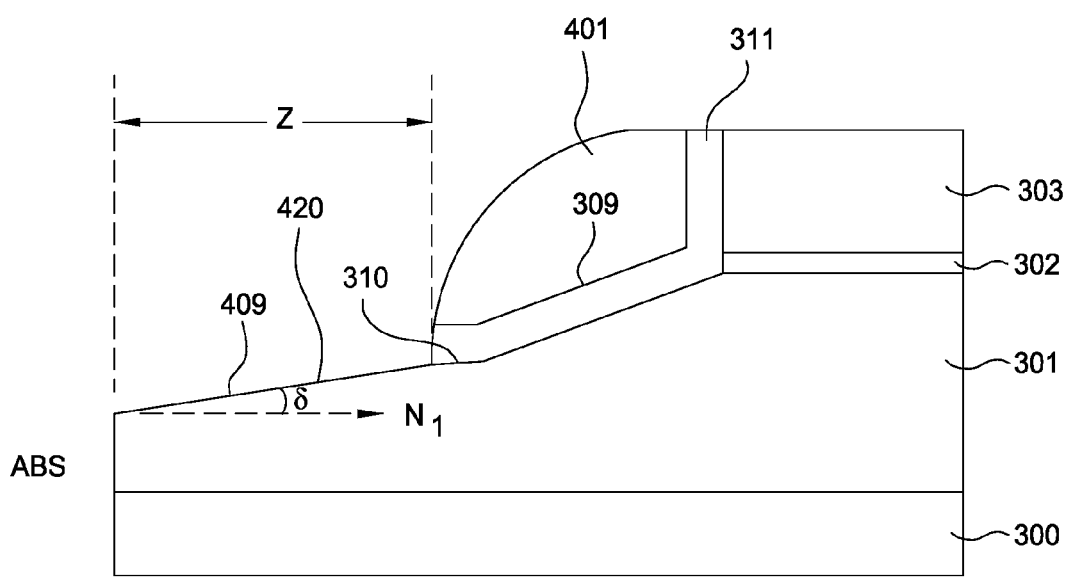

In one embodiment, a further ion milling step may be performed to remove exposed portions of the hard mask layer 311. FIG. 4E illustrates the structure after the further ion milling process, according to an embodiment of the invention. As illustrated in FIG. 4E, the ion milling process removes the portions of the hard mask layer 311 that are not under the non-magnetic layer 401, and exposes the magnetic pole 301 and the non-magnetic layer 303. The ion milling process may also remove portions of the non-magnetic layer 401, and any portion of the hard mask layer that is exposed as a result of the removal of portions of the non-magnetic layer 401, as illustrated in FIG. 4E.

Furthermore, the further ion milling process may remove additional portions of the magnetic pole 301, thereby creating a further tapered region 420 having a tapered surface 409. In one embodiment, the tapered surface may have a taper angle δ between around 25 degrees and 40 degrees from a direction normal to the ABS. The width Z of the tapered region 420 may be between around 50 nm and 200 nm. Forming the second tapered region with the tapered surface 409 may improve performance of the magnetic pole by concentrating magnetic flux of the write pole 301, thereby preventing undesired altering of adjacent tracks of a magnetic disk during operation of the magnetic head. In one embodiment, the combination of the surfaces 409, 310, and 309 may form a tapered region of the write pole, e.g., the tapered region 271 illustrated in FIG. 2A.

Figure 4F:
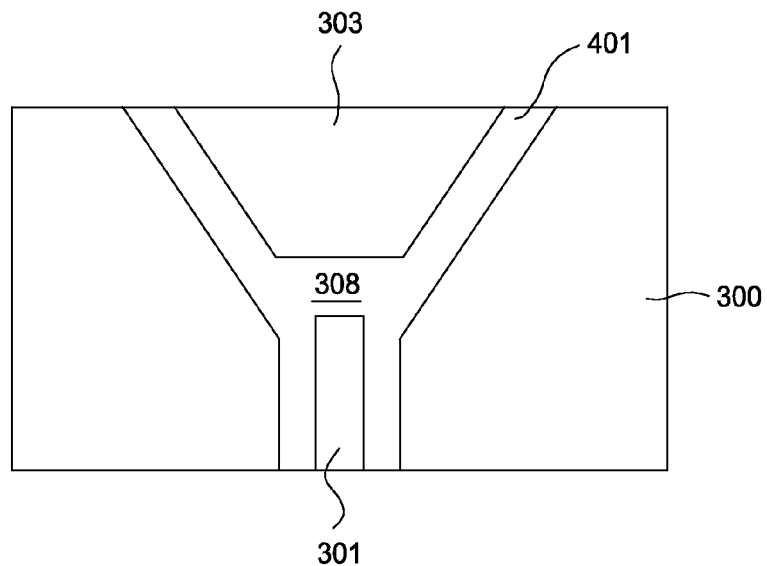

FIG. 4F illustrates a top view of the structure after the further ion milling step. As illustrated in FIG. 4F, the further ion milling exposes the non-magnetic layer 303 and a pole tip region of the magnetic pole 301. As further illustrated, the non-magnetic layer 401 may remain over the tapered region 308 and the sidewall portions of the magnetic pole 301.

Figure 4G:
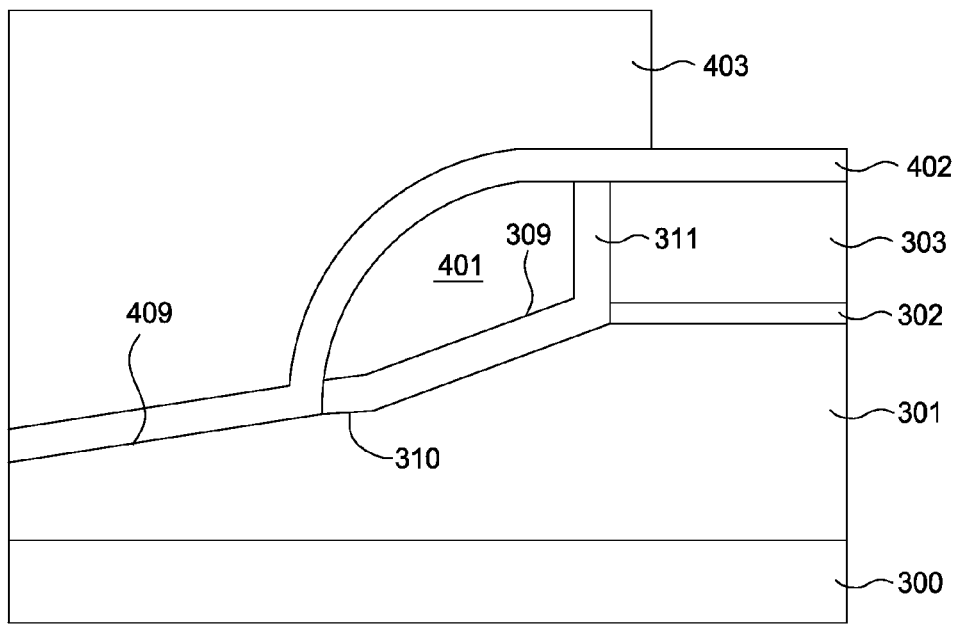
Figure 4H:
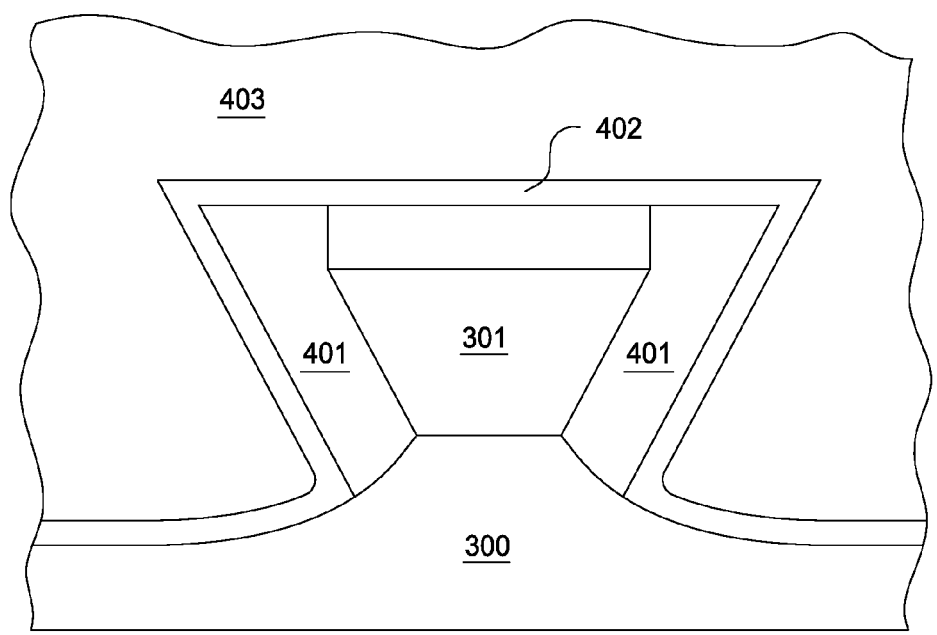

In one embodiment, after the further ion milling step, another non-magnetic layer 402 may be deposited over the structure, and a shield layer 403 may be patterned thereon. FIG. 4G illustrates a non-magnetic layer 402 that is deposited over the structure. The non-magnetic layer 402 may insulate the magnetic pole 301 from the shield layer 403. FIG. 4H is an ABS view of the exemplary structure according to an embodiment of the invention illustrating the magnetic pole 301 wherein sidewall portions of the magnetic pole are adjacent to the non-magnetic layer 401. The non-magnetic layer 402 is formed over the magnetic pole 301, along the top and sidewall surfaces of the non-magnetic layer 401. A wrap around shield layer 403 is also shown formed along the top and sidewall surfaces of the non-magnetic layer 402. The combination of the non-magnetic layers 303, 401, and 402, the RIE stop layer 302, and the hard mask layer 311 may correspond to the non-magnetic gap layer 256 illustrated in FIG. 2A.

The non-magnetic layer 401 may provide further separation between the shield layer 403 and the tapered surface 309 of the write pole 301. Greater separation between the write pole 301 and the shield layer 403 near the ABS results in an improved write field gradient which, in turn, results in a lower bit error rate during write operations of the write head. Specifically, an improved write field gradient reduces the possibility that tracks adjacent to a desired track are altered during write operations.

Figure 5:
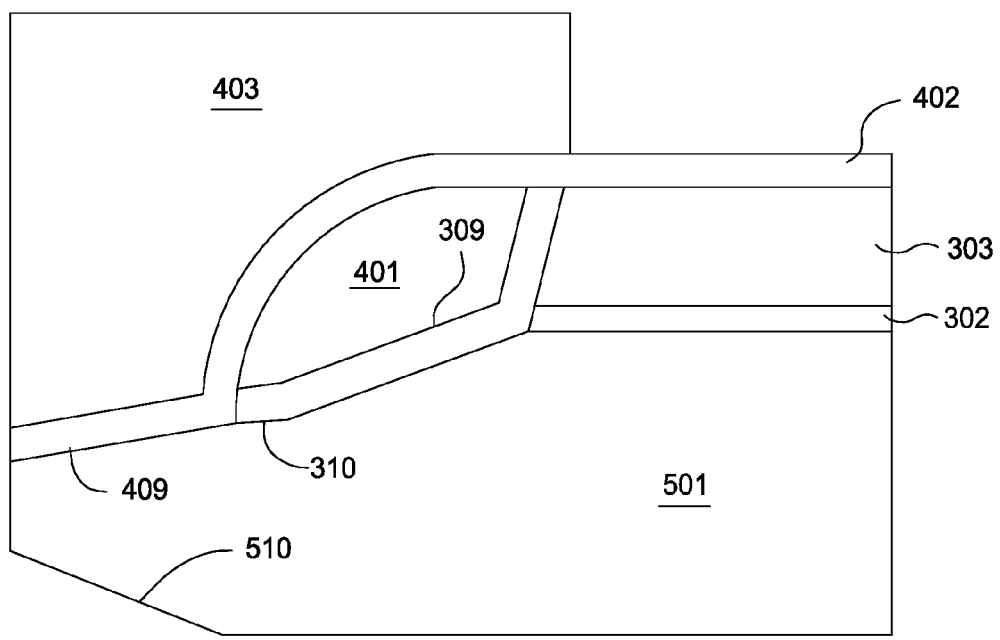
FIG. 5 illustrates a magnetic recording head according to an embodiment of the invention.

In one embodiment of the invention, one or more tapered surfaces may be provided on both, a leading edge and a trailing edge of the write pole. For example, in FIG. 4G, tapered surfaces are only shown on top (or along a trailing edge) of the write pole 301. In some embodiments, one or more tapered surfaces may be formed on both, the top and bottom (leading edge) of the write pole 301. FIG. 5 illustrates an exemplary structure 500 comprising a write pole 501 having tapered surfaces on both leading edge and trailing edges of the write pole. Along a trailing edge, the write pole 501 may include tapered surfaces 409 and 309.

The write pole 501 may also include at least one tapered surface 510 along a leading edge of the write pole, as illustrated in FIG. 5.

By providing a front bump layer that provides a greater separation distance between a write pole and a shield layer near a tapered portion of the write pole, embodiments of the invention greatly improve the performance of magnetic write heads.

While the foregoing is directed to embodiments of the present invention, other and further embodiments of the invention may be devised without departing from the basic scope thereof, and the scope thereof is determined by the claims that follow.

What is claimed is:

1. A magnetic head, comprising:
   a flared write pole comprising:
     a first tapered region having a first surface;
     a second tapered region having a second surface; and
     a third region disposed between the first tapered region and the second tapered region and having a third surface, wherein the third surface is substantially normal to an air bearing surface (ABS) of the magnetic head;
   a first non-magnetic layer formed over the first surface;
   a second non-magnetic layer formed over at least the second surface; and
   a shield layer formed on the second non-magnetic layer.

2. The magnetic head of claim 1, further comprising a third tapered surface along a leading edge of the write pole.

3. The magnetic head of claim 1, wherein the first non-magnetic layer is disposed on at least a portion of the second surface.

4. The magnetic head of claim 1, wherein the first tapered surface is disposed at an angle between 10 degrees and 40 degrees from a direction normal to an ABS of the magnetic head.

5. The magnetic head of claim 1, wherein the second tapered surface is disposed at an angle between 25 degrees and 40 degrees from a direction normal to an ABS of the magnetic head.

6. The magnetic head of claim 1, wherein the first non-magnetic layer and the second non-magnetic layer separate the shield layer from the write pole.

7. The magnetic head of claim 1, wherein a width of the first tapered surface is between 100 nm and 200 nm.

8. The magnetic head of claim 1, wherein a width of the second tapered surface is between 50 nm and 200 nm.

9. A magnetic head, comprising:
   a flared write pole comprising:
     a first tapered region having a first surface;
     a second tapered region having a second surface; and
     a third region disposed between the first tapered region and the second tapered region and having a third surface, wherein the third surface is substantially normal to an air bearing surface (ABS) of the magnetic head;
   a first non-magnetic layer formed over the first surface, the first non-magnetic layer formed with at least one of: Tantalum (Ta); Tantalum Oxide (TaO); Ruthenium (Ru); Nickel-Chromium (NiCr); Silicon-Carbide (SiC); and Aluminum Oxide ($Al_2O_3$);
   a second non-magnetic layer formed over at least the second surface, the second non-magnetic layer formed with at least one of: Tantalum (Ta); Tantalum Oxide (TaO); Ruthenium (Ru); Nickel-Chromium (NiCr); Silicon-Carbide (SiC); and Aluminum Oxide ($Al_2O_3$); and a shield layer formed on the second non-magnetic layer.

10. The magnetic head of claim 9, wherein the first surface is disposed at an angle between 10 degrees and 40 degrees from a direction normal to an ABS of the magnetic head, and the second surface is disposed at an angle between 25 degrees and 40 degrees from the direction normal to the ABS of the magnetic head.

* * * * *

UNITED STATES PATENT AND TRADEMARK OFFICE
CERTIFICATE OF CORRECTION

PATENT NO. : 8,498,078 B2
APPLICATION NO. : 12/634533
DATED : July 30, 2013
INVENTOR(S) : Allen et al.

It is certified that error appears in the above-identified patent and that said Letters Patent is hereby corrected as shown below:

In the Specification

Column 4, Line 25, delete "51" and insert -- S1 -- therefor;

Column 7, Line 55, delete "reist" and insert -- resist -- therefor;

Column 8, Line 50, delete "it" and insert -- il -- therefor.

Signed and Sealed this
First Day of October, 2013

Teresa Stanek Rea
*Deputy Director of the United States Patent and Trademark Office*